(12) United States Patent
Chen et al.

(10) Patent No.: US 7,023,507 B2
(45) Date of Patent: Apr. 4, 2006

(54) COLOR FILTER HAVING A CONDUCTIVE SEGMENT ON AN INSULATING SEGMENT, THE CONDUCTIVE SEGMENT CONFIGURED TO ELECTRICALLY CONNECT AN ELECTRODE LAYER AT OPPOSITE SIDES OF THE INSULATING SEGMENT

(75) Inventors: Jun Chang Chen, Taichung (TW); Ya-Hsiang Tai, Hsinchu (TW)

(73) Assignee: Toppoly Optoelectronics Corp., Chun-Nan (TW)

( * ) Notice: Subject to any disclaimer, the term of this patent is extended or adjusted under 35 U.S.C. 154(b) by 0 days.

(21) Appl. No.: 10/610,056

(22) Filed: Jun. 30, 2003

(65) Prior Publication Data

US 2004/0263721 A1    Dec. 30, 2004

(51) Int. Cl.
G02F 1/1335 (2006.01)
G02F 1/1333 (2006.01)
G02F 1/1343 (2006.01)

(52) U.S. Cl. .................. 349/106; 349/111; 349/148
(58) Field of Classification Search ............... 349/106, 349/110, 141, 111
See application file for complete search history.

(56) References Cited

U.S. PATENT DOCUMENTS

| | | | | |
|---|---|---|---|---|
| 5,212,575 A | * | 5/1993 | Kojima et al. | 349/147 |
| 5,633,739 A | * | 5/1997 | Matsuyama et al. | 349/106 |
| 5,721,599 A | * | 2/1998 | Cheng | 349/106 |
| 5,850,271 A | * | 12/1998 | Kim et al. | 349/111 |
| 5,963,277 A | * | 10/1999 | Kim et al. | 349/12 |
| 6,099,993 A | * | 8/2000 | Kim et al. | 430/7 |

* cited by examiner

Primary Examiner—Andrew Schecter
Assistant Examiner—Jeanne Andrea Di Grazio
(74) Attorney, Agent, or Firm—Quintero Law Office (57) ABSTRACT

A color filter and fabricating method thereof. The color filter includes a transparent substrate, provided with a plurality of parallel first light-shielding lines, extending in a first direction, and a plurality of parallel second light-shielding lines, extending in a second direction, wherein a sub-pixel area is defined by two adjacent first light-shielding lines and two adjacent second light-shielding lines. A color-filtering area is formed in the sub-pixel area. An electrode layer is formed on the transparent substrate. At least one insulating line is formed on the electrode layer, directly above a part of the first or the second light-shielding lines, and a conductive line is formed on the insulating line, extending over both ends of the insulating line to electrically connect the electrode layer.

17 Claims, 10 Drawing Sheets

COLOR FILTER HAVING A CONDUCTIVE SEGMENT ON AN INSULATING SEGMENT, THE CONDUCTIVE SEGMENT CONFIGURED TO ELECTRICALLY CONNECT AN ELECTRODE LAYER AT OPPOSITE SIDES OF THE INSULATING SEGMENT

BACKGROUND OF THE INVENTION

1. Field of the Invention

The present invention relates to a color filter, and more particularly to a color filter with reduced crosstalk.

2. Description of the Related Art

Liquid crystal display (LCD) is a commonly used flat panel display technology. Owing to dielectric anisotropy and conductive anisotropy of liquid crystal molecules, molecular orientation of liquid crystals can be shifted under an external electronic field, such that various optical effects are produced.

An LCD panel is generally made up of two substrates, with a certain gap preserved therebetween, and a liquid crystal layer filled in the gap. Respective electrodes are formed on the two substrates, respectively, to control the orientation and shift of liquid crystal molecules.

A TFT (thin film transistor) LCD panel is generally made up of a TFT array substrate and a color filter substrate. The detailed structure of the color filter substrate is described as follows.

Figure 1:
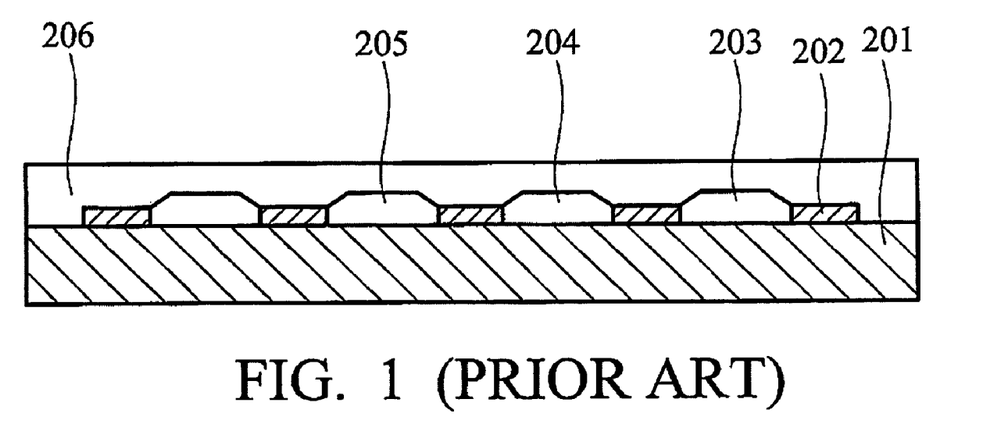
FIG. 1 illustrates the structure of a color filter.

FIG. 1 illustrates the structure of the color filter. The color filter includes a glass substrate 201, a black matrix (BM) 202 for anti-reflection, color-filtering units of red 203, green 204, and blue 205, and a sputtered pixel electrode layer 206 as a corresponding electrode to the pixel electrode 105 of TFT array substrate. The shapes, sizes, colors, and arrangements of the color-filtering units are adjustable according to requirements. The pixel electrode layer 206 is a transparent conductive layer of, for example, indium tin oxide layer.

Due to the full coverage of electrode layer 206 on the color filter substrate 201, the area of the electrode layer 206 increases for larger display panels, which increases electric resistance, weakens the signals, and produces crosstalk, deteriorating display quality and affecting yield. Moreover, crosstalk becomes more serious in larger display panels.

SUMMARY OF THE INVENTION

Accordingly, an object of the present invention is to reduce crosstalk, thereby ameliorating display quality problems.

Therefore, in the invention, the electric resistance of electrode layer on the color filter substrate is reduced to avoid weakening of signals, thereby crosstalk is reduced, and display quality is improved.

The invention provides a color filter, applicable for an LCD panel, which comprises a transparent substrate with a plurality of parallel first light-shielding lines, extending in a first direction, and a plurality of parallel second light-shielding lines, extending in a second direction, formed thereon, wherein a sub-pixel area is defined by two adjacent first light-shielding lines and two adjacent second light-shielding lines. A color-filtering area is formed in the sub-pixel area, an electrode layer is formed on the transparent substrate, at least one insulating line is formed on the electrode layer, directly above a part of the first or the second light-shielding lines, and a conductive line is formed on the insulating line, extending over both ends of the insulating line to electrically connect the electrode layer.

A method of fabricating a color filter is further provided, which comprises providing a transparent substrate with a plurality of parallel first light-shielding lines, extending in a first direction, and a plurality of parallel second light-shielding lines, extending in a second direction, formed thereon, wherein a sub-pixel area is defined by two adjacent first light-shielding lines and two adjacent second light-shielding lines, forming a color-filtering area in the sub-pixel area, forming an electrode layer on the transparent substrate, forming at least one insulating line on the electrode layer, directly above a part of the first or the second light-shielding lines, and forming a conductive line on the insulating line, extending over both ends of the insulating line to electrically connect the electrode layer.

According to the invention, the insulating line can be directly on a part of the electrode layer, directly above the first light-shielding line. The conductive line is preferably made of Cr, Al or AlNd. The electrode layer is not limited to any specific material, and is preferably made of indium tin oxide (ITO) or indium zinc oxide (IZO).

According to the invention, the color filter can further comprise a plurality of insulating lines, each formed directly above respective first light-shielding lines, and a plurality of conductive lines, each formed directly above respective first light-shielding lines.

According to the inventive color filter and fabricating method thereof, by forming an extra conductive line, electrically connected in parallel to the electrode layer via both ends of an insulating line formed thereunder, directly above the light-shielding lines, the electric resistance of the electrode layer under the conductive line is reduced, and the weakening of signals is thereby avoided, reducing crosstalk and improving display quality.

DESCRIPTION OF THE DRAWINGS

The present invention can be more fully understood by reading the subsequent detailed description and examples with references made to the accompanying drawings, wherein.

DETAILED DESCRIPTION OF THE INVENTION

Manufacture of TFT Array Substrate

Figure 2:
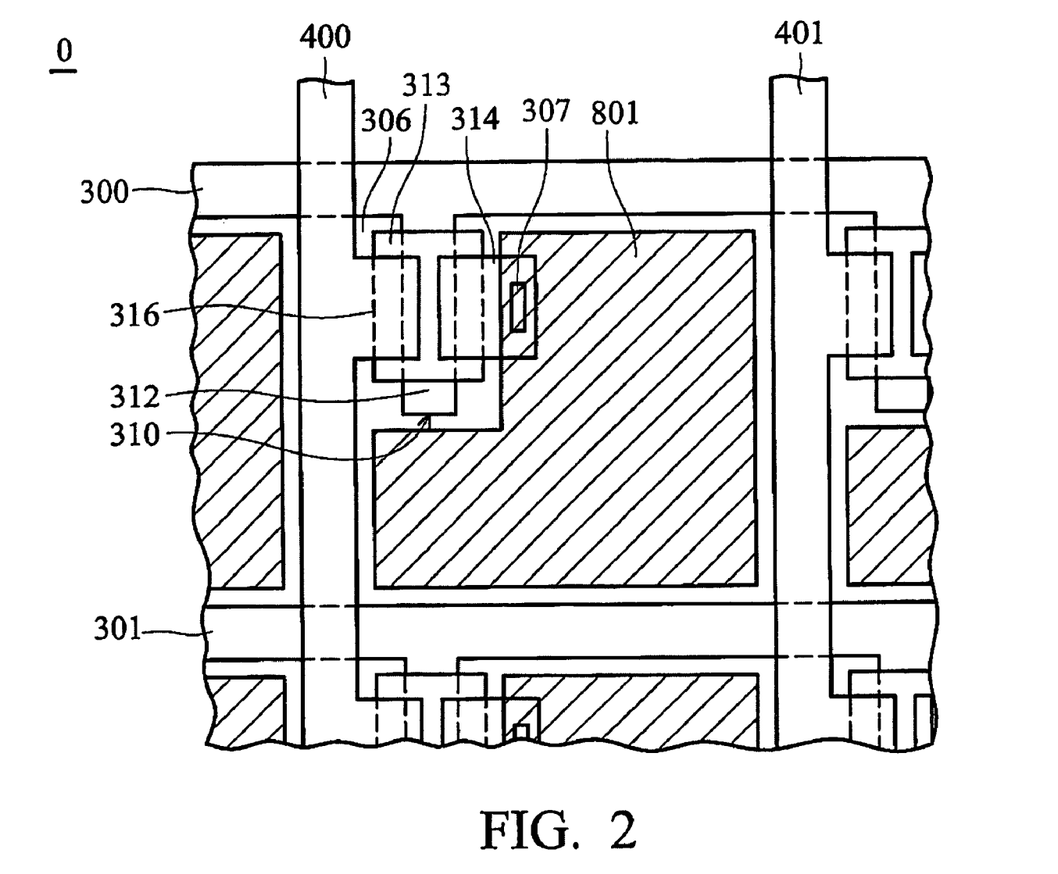
FIG. 2 is a top view of the TFT array substrate of the embodiment.

FIG. 2 is a top view of the TFT array substrate of the embodiment.

First, as in FIG. 2, a substrate 0 of, for example, glass, is provided with gate lines 300, 301 and a gate electrode 312 formed thereon. Next, a gate insulating layer (not shown) is formed on the gate lines 300, 301, gate electrode 312 and the substrate 0. The gate lines 300, 301 and gate electrode 312 are, for example, metal. The gate insulating layer is, for example, $SiO_2$, $SiN_x$, or silicon oxynitride.

α-Si layer (below a $n^+$ α-Si layer 313, not shown) and the $n^+$ α-Si layer 313 are then formed on part of the gate insulating layer to form an α-Si semiconductor island on a TFT area 310.

Then, signal lines 400, 401, a source electrode 316 and a drain electrode 314 are formed, wherein the source electrode 316 is electrically connected to the signal line 400.

Then, a transparent photoresist (not shown) is formed conformally on the substrate 0, followed by a photolithography step whereby a contact hole 307 above the drain electrode 314 is formed to expose part of the surface of the drain electrode 314.

Finally, a pixel electrode 801, electrically connected to the drain electrode 304 via the contact hole 307, of high-transparency and low-resistance material, e.g. ITO, is formed on a sub-pixel area 306.

Manufacture of Color Filter

Currently, numerous methods have been developed to fabricate color filters, including pigment dispersion, dyeing, electrodeposition, and printing. In the invention, pigment dispersion is utilized to illustrate the manufacture of the color filter substrate.

Figure 3A:
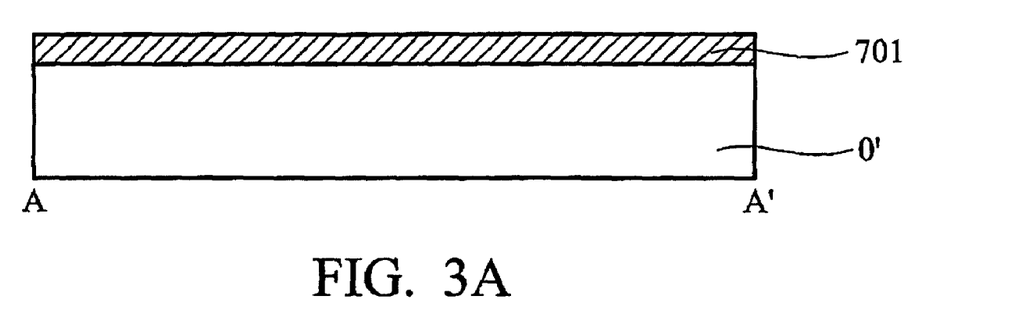
FIGS. 3A–3L show the manufacturing process of color filter of the invention.
Figure 3B:
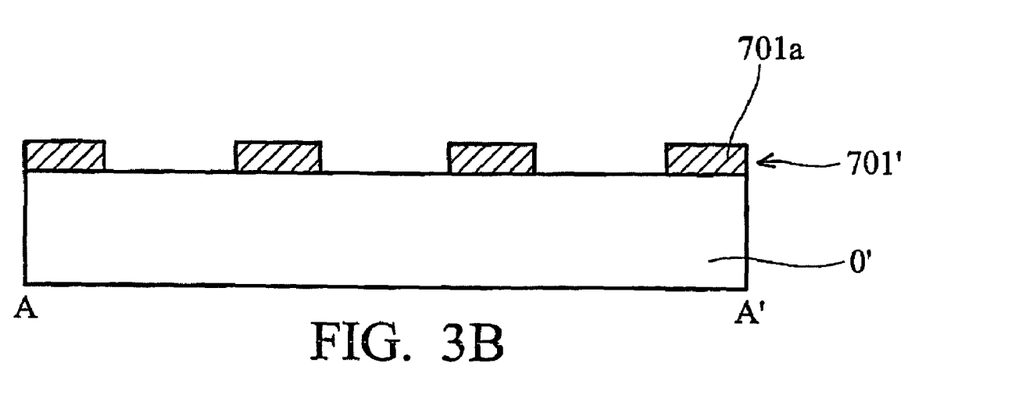
Figure 3C:
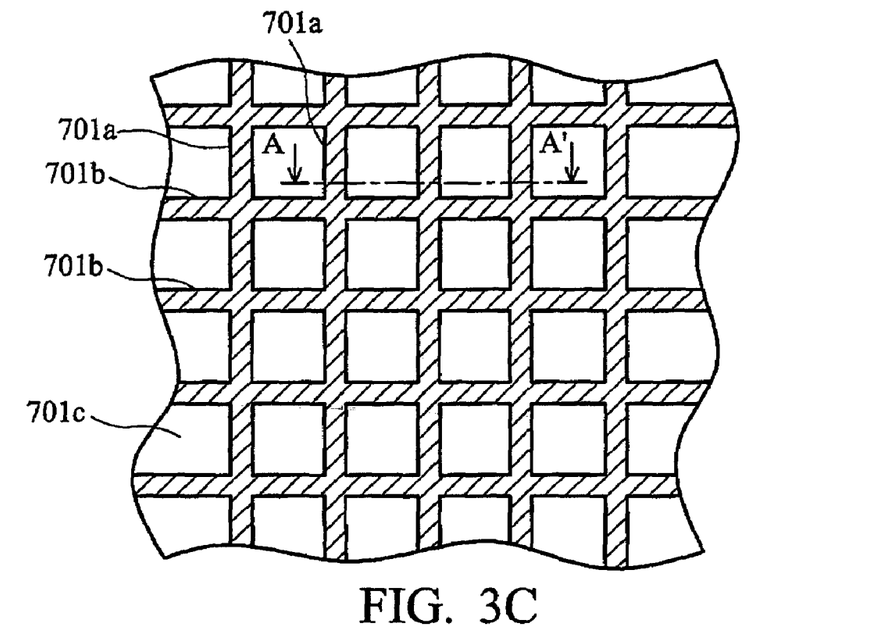
Figure 3D:
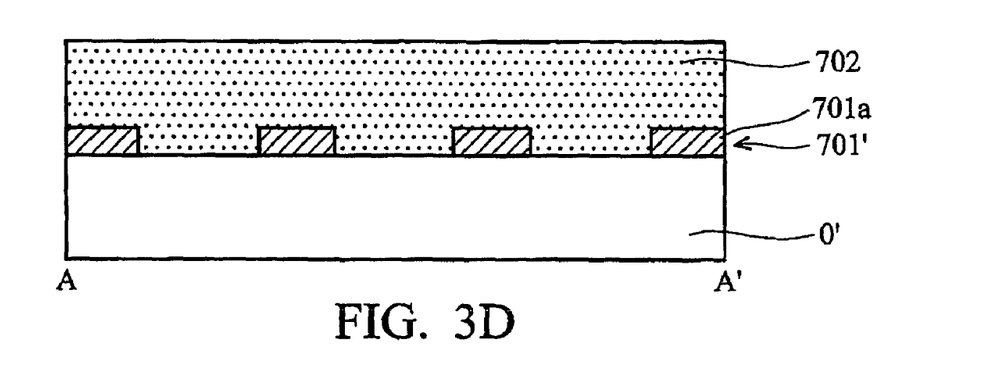
Figure 3E:
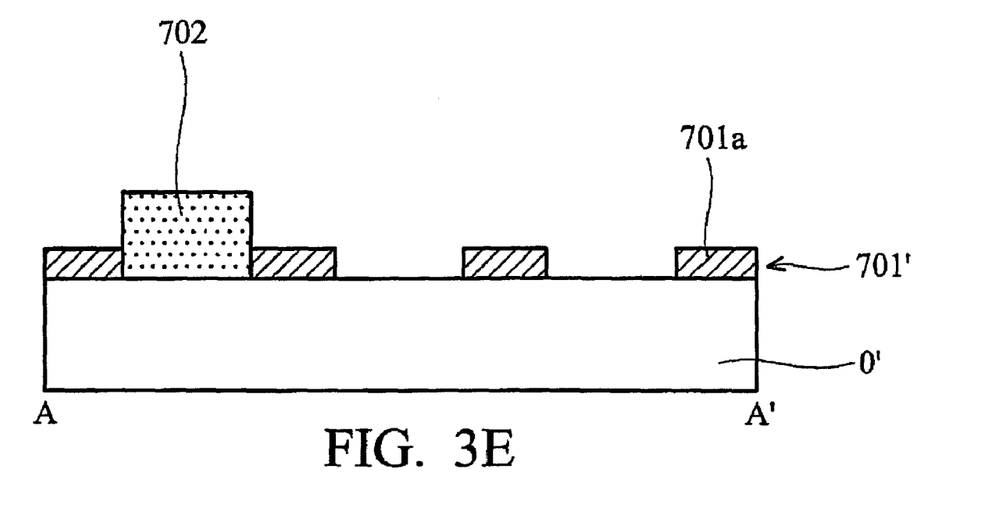
Figure 3F:
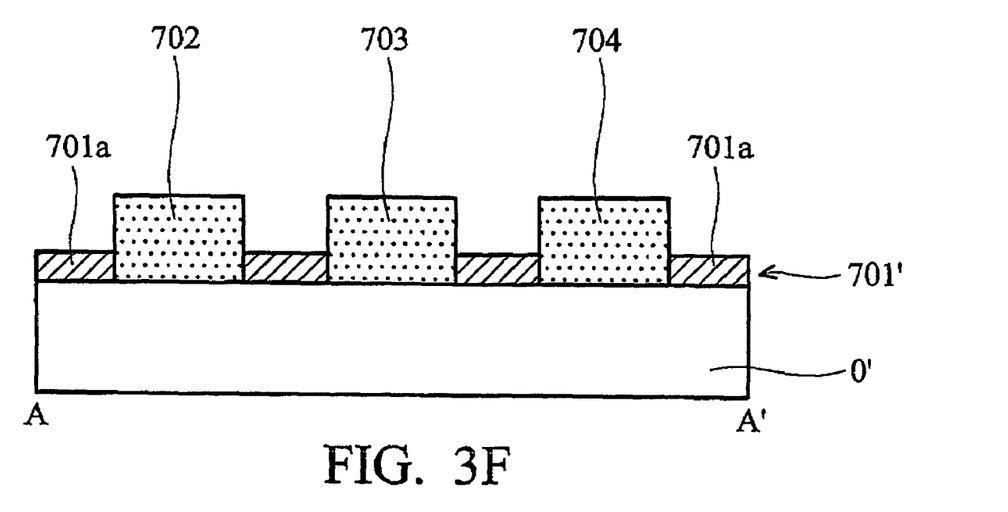
Figure 3G:
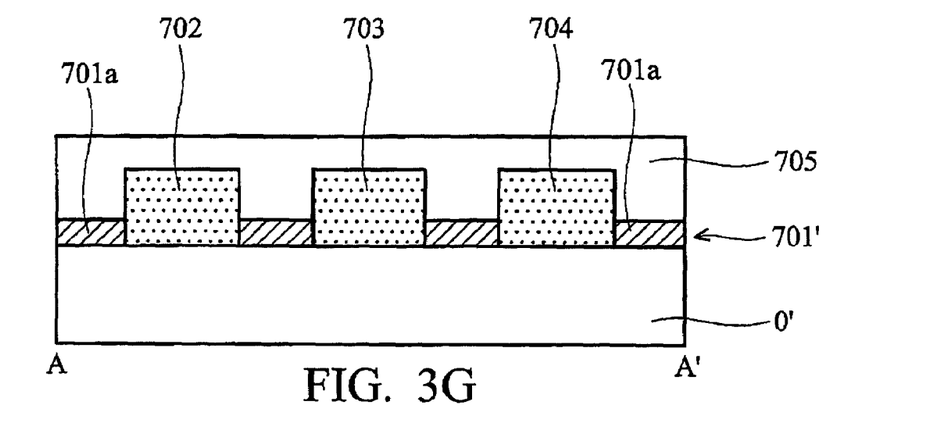
Figure 3H:
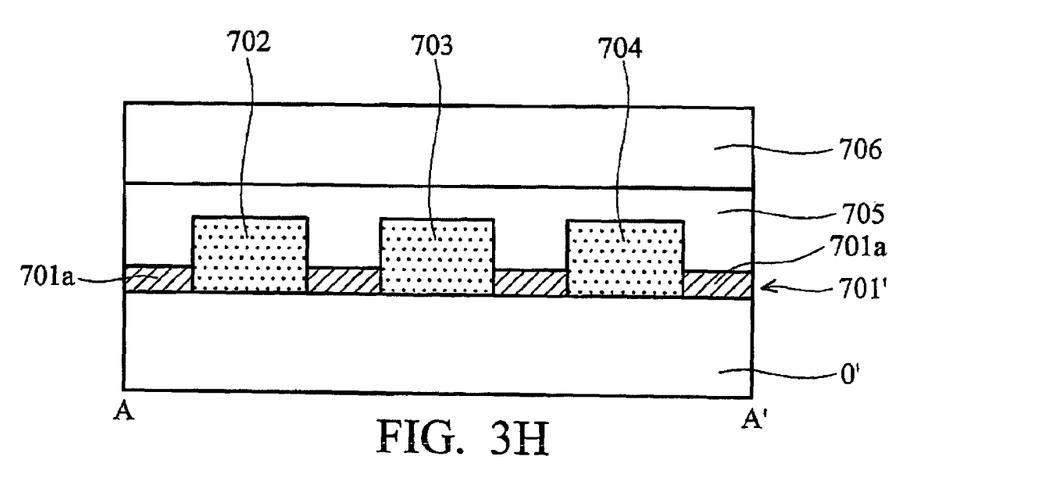
Figure 3I:
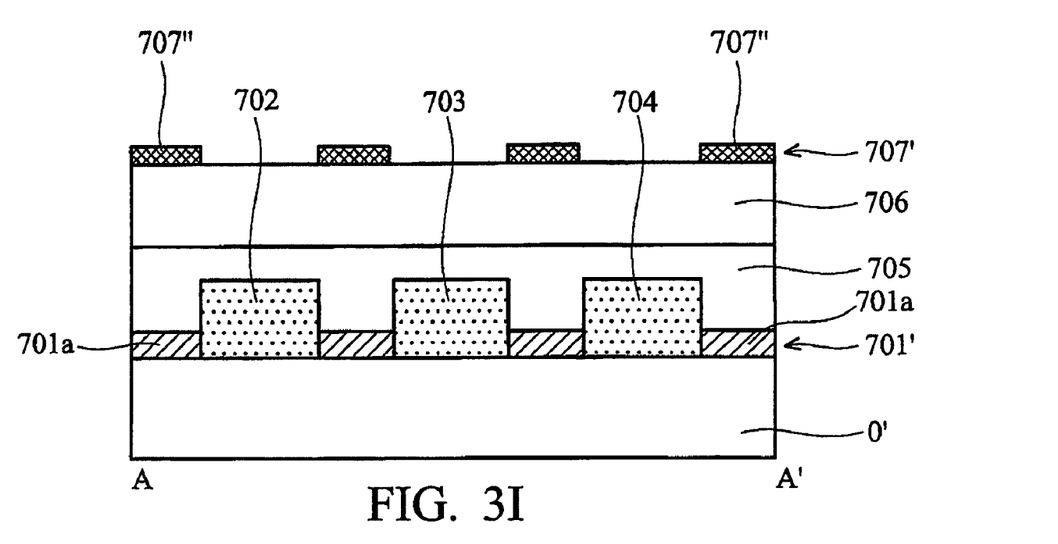
Figure 3J:
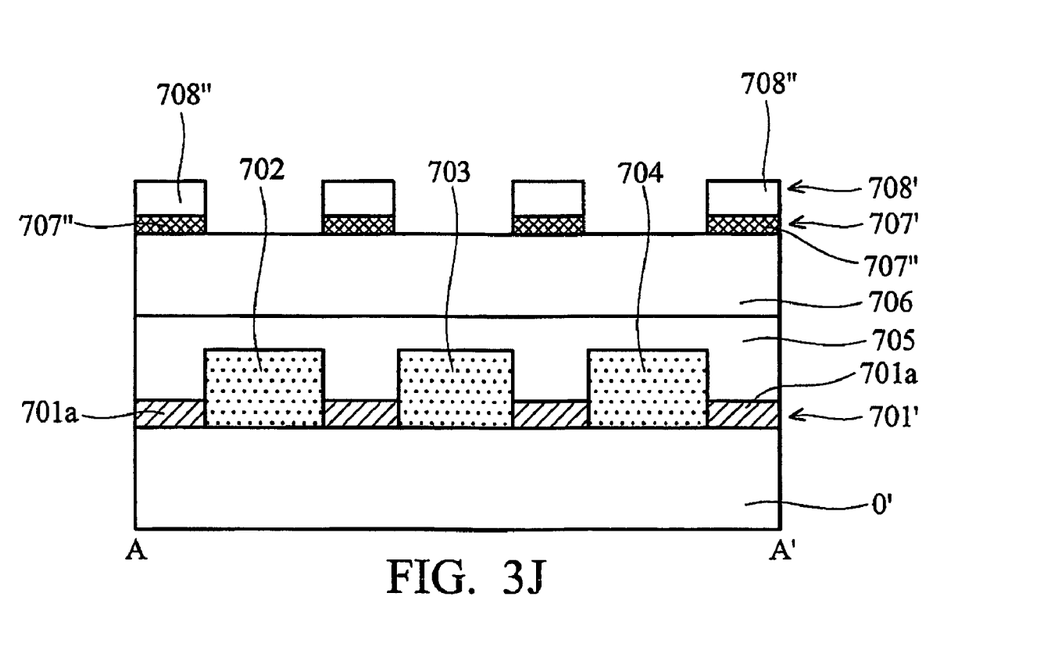
Figure 3K:
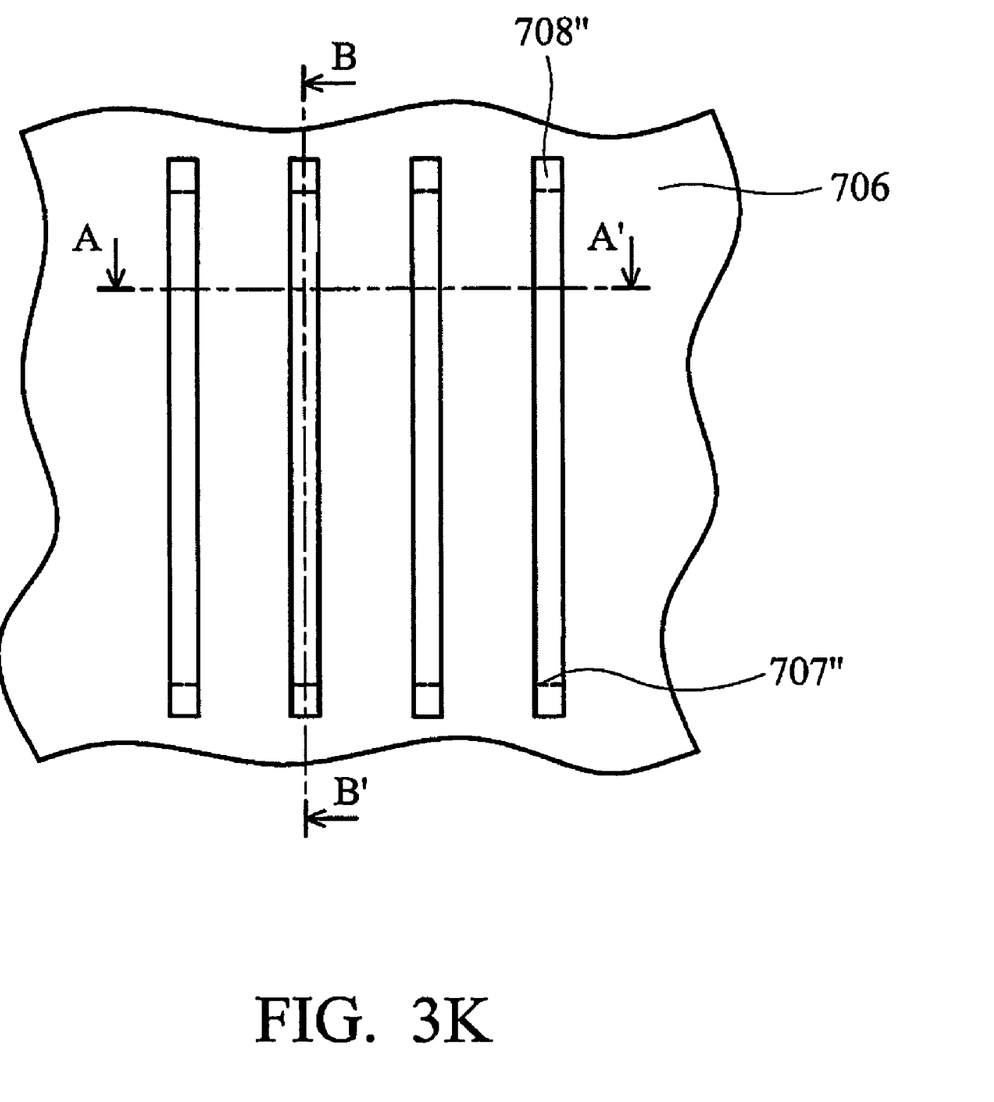
Figure 3L:
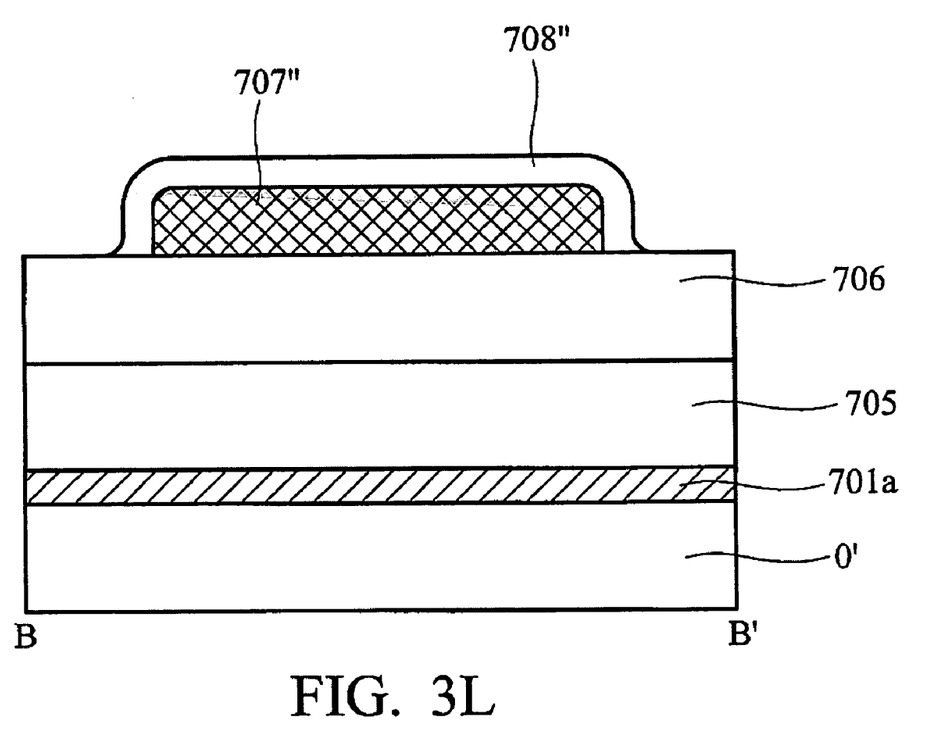

FIGS. 3A–3L show the manufacturing process of the color filter of the invention, wherein FIG. 3B is a sectional diagram along line A–A' of FIG. 3C, FIG. 3J is a sectional diagram along line A–A' of FIG. 3K, and FIG. 3L is a sectional diagram along line B–B' of FIG. 3K.

In FIG. 3A, a glass substrate 0' is provided with a light shielding layer 701 of, for example Cr or black photo-sensitive resin formed thereon.

In FIG. 3B, the light shielding layer 701 is patterned by photolithography to be matrix-shaped light shielding layer 701', that is, black matrix (BM), to shield light and separate color-filtering resins of different colors to enhance color contrast.

FIG. 3C is a top-view of the matrix-shaped light shielding layer 701', including a plurality of parallel first light-shielding lines 701a, extending in a first direction, and a plurality of parallel second light-shielding lines 701b, extending in a second direction. A sub-pixel area 701c is defined by two adjacent first light-shielding lines 701a and two adjacent second light-shielding lines 701b.

Next, color-filtering units of red, green and blue are sequentially formed.

In FIG. 3D, red resin is first spin-coated over the substrate 0' to form a red color-filtering layer 702. Then, as in FIG. 3E, photolithography is performed to leave only the red resin in the predetermined area.

In FIG. 3F, in the same manner, blue and green resin are sequentially spin-coated over the substrate 0', and blue color-filtering units 703 and green color-filtering units 704 remain in the respective predetermined sub-pixel areas.

In FIG. 3G, a transparent planarization layer 705 is then formed on the substrate 0'. Then, as in FIG. 7G, an electrode layer 706 of, for example, transparent conductive material, e.g. ITO or IZO, is formed on the planarization layer 705 to drive the molecular orientation of liquid crystals. Then, as a critical step of the present invention, an insulating layer of, for example, $SiO_2$ or $SiN_x$, is formed on the electrode layer 706. A photoresist layer (not shown) is then formed on the insulating layer, following a photolithography step to form a patterned insulating layer 707', as shown in FIG. 3I. The patterned insulating layer 707' is made up of a plurality of insulating lines 707", directly above a part of the first light-shielding lines 701a. However, the insulating lines 707" can also be formed directly above a part of the second light-shielding lines 701b, or directly above a part of the first light-shielding lines 701a and the second light-shielding lines 701b.

Then, a conductive layer 708 of, for example, Cr, Al or AlNd is formed conformally on the electrode layer 706. A photoresist layer (not shown) is then formed on the conductive layer 708, following a photolithography step to form a patterned conductive layer 708', as shown in FIG. 3J. The patterned conductive layer 708' is made up of a plurality of conductive lines 708" formed on the insulating lines 707".

In the invention, the length and quantity of the insulating lines 707" and conductive lines 708" are not limited, as long as at least one conductive line 708" is formed connected in parallel to the electrode layer 706, and the electric resistance of the electrode layer 706 is thereby reduced. The greater the length/quantity of the insulating lines 707" and conductive lines 708", however, the better. In the embodiment, a plurality of insulating lines 707" and conductive lines 708" are formed corresponding to each first light-shielding line 701a. FIG. 3K shows a top view of part of the color filter. In the embodiment, the insulating lines 707" and conductive lines 708" are formed by respective photolithography.

FIG. 3L is a cross-section of the insulating lines 707" and conductive lines 708" taken along the direction of the insulating lines 707". As shown in FIG. 3L, the conductive line 708" is longer than the insulating lines 707" thereunder, extending over both ends of the insulating lines 707" to connect the electrode layer 706 and form a parallel circuit to reduce the electric resistance of the electrode layer 706.

Cell Process

Next, as a normal fabricating process of LCD panel, the color filter substrate 0' and TFT array substrate 0 are aligned and combined, such that each sub-pixel area 306 corresponds to a color filtering unit 702, 703, or 704.

Figure 4:
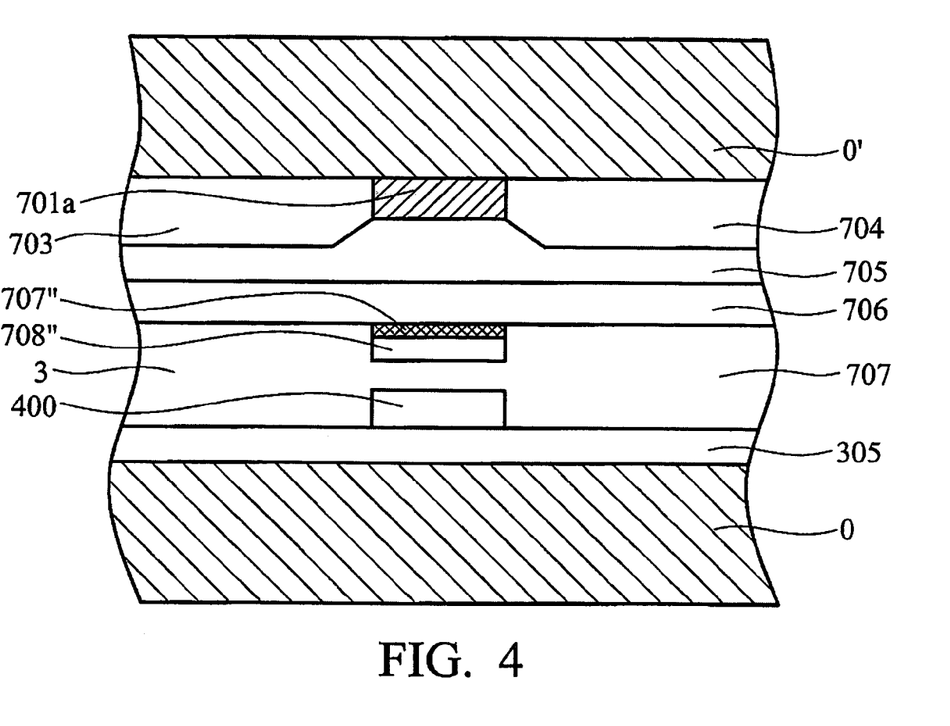
FIG. 4 shows a cross-section of the LCD panel in the embodiment.

Afterward, liquid crystal 3 is filled into the LCD panel, following the sealing of the panel. FIG. 4 shows a cross-section of the LCD panel in the embodiment.

According to the above-described color filter and fabricating method thereof, by forming an extra conductive line, electrically connected in parallel to the electrode layer via both ends of an insulating line formed thereunder, directly above the light-shielding lines, the electric resistance of the electrode layer under the conductive line is reduced, and the weakening of signals is thereby avoided, reducing crosstalk and improving display quality.

The foregoing description has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A color filter, applicable for an LCD panel, comprising:
a transparent substrate with a plurality of parallel first light-shielding lines, extending in a first direction, and a plurality of parallel second light-shielding lines, extending in a second direction, formed thereon, wherein a sub-pixel area is defined by two adjacent first light-shielding lines and two adjacent second light-shielding lines;
a color-filtering area in the sub-pixel area;
an electrode layer on the transparent substrate;

at least one insulating segment directly on a part of the electrode layer, directly over the first light-shielding lines; and a conductive segment on the insulating segment and extending along two opposite sidewalls of the insulating segment to electrically connect the electrode layer at opposite sides of the insulating segment.

2. The color filter as claimed in claim 1, wherein the transparent substrate is glass.

3. The color filter as claimed in claim 1, wherein the first and second light-shielding lines are made of Cr.

4. The color filter as claimed in claim 1, wherein the electrode layer is an indium tin oxide or indium zinc oxide layer.

5. The color filter as claimed in claim 1, wherein the conductive segment is made of Cr, Al or AlNd.

6. The color filter as claimed in claim 1, further comprising a plurality of insulating segments, each formed directly over respective first light-shielding lines.

7. The color filter as claimed in claim 6, further comprising a plurality of conductive segments, each formed directly over respective first light-shielding lines.

8. The color filter as claimed in claim 6, wherein the first and the second directions are perpendicular.

9. A method of fabricating a color filter for LCD panel, comprising:

providing a transparent substrate with a plurality of parallel first light-shielding lines, extending in a first direction, and a plurality of parallel second light-shielding lines, extending in a second direction, formed thereon, wherein a sub-pixel area is defined by two adjacent first light-shielding lines and two adjacent second light-shielding lines;

forming a color-filtering area in the sub-pixel area;

forming an electrode layer on the transparent substrate;

forming at least one insulating segment directly on a part of the electrode layer, directly over the first light-shielding lines; and forming a conductive segment on the insulating segment and extending along two opposite sidewalls of the insulating segment to electrically connect the electrode layer at opposite sides of the insulating segment.

10. The method as claimed in claim 9, wherein the transparent substrate is glass.

11. The method as claimed in claim 9, wherein the first and second light-shielding lines are made of Cr.

12. The method as claimed in claim 9, wherein the electrode layer is an indium tin oxide or indium zinc oxide layer.

13. The method as claimed in claim 9, wherein the conductive segment is made of Cr, Al or AlNd.

14. The method as claimed in claim 9, further comprising a step of forming a plurality of insulating segments on the electrode layer, each formed directly over respective first light-shielding lines.

15. The method as claimed in claim 14, further comprising a step of forming a plurality of conductive segments on the insulating lines.

16. The method as claimed in claim 9, wherein the first and the second directions are perpendicular.

17. The method as claimed in claim 9, wherein the insulating segment and conductive segment are formed by respective photolithography.

* * * * *